United States Patent [19]
Yamada et al.

[11] Patent Number: 5,347,502
[45] Date of Patent: Sep. 13, 1994

[54] FOCUSING CONTROL SYSTEM FOR USE IN AN INFORMATION RECORDING AND REPRODUCING APPARATUS

[75] Inventors: Shinichi Yamada, Hirakata; Masayuki Shibano, Izumisano, both of Japan

[73] Assignee: Matsushita Electric Industrial Co., Ltd., Osaka, Japan

[21] Appl. No.: 972,581

[22] Filed: Nov. 6, 1992

[30] Foreign Application Priority Data

Nov. 8, 1991 [JP] Japan ................................ 3-292987

[51] Int. Cl.$^5$ ............................................. G11B 7/09
[52] U.S. Cl. ................... 369/44.29; 369/44.36; 369/54; 369/44.34
[58] Field of Search ............... 369/44.35, 44.36, 44.41, 369/44.11, 44.25, 44.29, 54, 44.28, 44.34, 32; 250/201.5

[56] References Cited

U.S. PATENT DOCUMENTS

| | | | |
|---|---|---|---|
| 4,344,165 | 8/1992 | Akiyama | 369/44.36 |
| 4,475,182 | 10/1984 | Hosaka | 369/44.36 |
| 4,878,211 | 10/1989 | Suzuki et al. | 369/44.35 |
| 4,942,564 | 7/1990 | Hofer et al. | 369/44.35 X |
| 5,050,149 | 9/1991 | Ishii et al. | 369/44.35 |

FOREIGN PATENT DOCUMENTS

| | | | |
|---|---|---|---|
| 0390977 | 10/1990 | European Pat. Off. | 369/44.35 |
| 2-98881 | 4/1990 | Japan . | |

*Primary Examiner*—W. R. Young
*Assistant Examiner*—Thang V. Tran
*Attorney, Agent, or Firm*—Ratner & Prestia

[57] ABSTRACT

In an information recording and reproducing apparatus, a focusing control system performs a focusing control operation wherein a beam for reproducing signals from a recording surface of a recording medium is focused on the recording surface of the recording medium. The focusing control system includes a differential amplifier for outputting a signal indicating an amount of deviation between the position of a point (a focus of the beam) on which the beam is focused and that of the recording surface of the recording medium, an amplifier for amplifying an output signal from the differential amplifier, and an A/D converter for converting an output signal from the amplifier to a digital signal. The system further includes a focusing control driver for moving the focus of the beam in a direction perpendicular to the recording surface of the recording medium, and a computer or processor for controlling the focusing control driver in response to an output signal from the A/D converter so that the focus of the beam may be positioned appropriately on the recording surface of the recording medium. An amplification factor of the amplifier is reduced during a given period after the focusing control operation is triggered or when the level of the signal from the differential amplifier deviates from a predetermined range.

10 Claims, 11 Drawing Sheets

FOCUSING CONTROL SYSTEM FOR USE IN AN INFORMATION RECORDING AND REPRODUCING APPARATUS

BACKGROUND OF THE INVENTION

1. Field of the Invention

The present invention relates to a focusing control system for performing a focusing control in an optical disc apparatus which records or reproduces information on or from an information carrier having a large number of information tracks using a beam emitted from a semiconductor laser diode or the like.

2. Description of the Prior Art

FIG. 1 schematically depicts a conventional focusing control system provided in an optical disc apparatus. An information carrier or recording medium 1 is mounted on a rotary shaft of a motor 2 for rotation together therewith at a predetermined speed. A spiral groove having a number of tracks, on which signals have already been recorded, is formed on the recording medium 1. The width and the pitch of the tracks are 0.6 $\mu$m and 1.6 $\mu$m, respectively. A beam 4 emitted from a light source 3 such as, for example, a semiconductor laser diode is collimated by a coupling lens 5 and then passes through a polarization beam splitter 6 and a $\frac{1}{4}$ wavelength plate 7. Thereafter, the parallel beam is reflected from a total reflection mirror 8, converged by an objective lens 10, and is eventually irradiated on the recording medium 1. The objective lens 10 is secured to a movable member 40 having a bearing. The bearing allows the movable member 40 to move up and down along a vertically extending slide shaft 51 secured to a carrier 13 and to rotate about the slide shaft 51. The movable member 40 is connected with the carrier 13 by means of a rubber spring 52 and is appropriately adjusted such that an optical axis of the beam 4 is generally aligned with that of the objective lens 10. The carrier 13 can move on a platform 53 in a direction radially of the recording medium 1. When a coil 89 is energized by making an electric current flow therein, the movable member 40 receives the electromagnetic force therefrom and moves up and down along the slide shaft 51.

Light 9 reflected from the recording medium 1 passes through the objective lens 10 and is further reflected from the total reflection mirror 8. Thereafter, the light passes through the $\frac{1}{4}$ wavelength plate 7 and is reflected from the polarization beam splitter 6. The light then enters a detection lens 81 and passes therethrough. At this moment, a part of the light is irradiated on an optical detector 11, whereas the remaining part of the light is reflected from a reflection mirror 82 and is used for a trucking control. The optical detector 11 is of two-split construction, and two outputs therefrom are input into respective amplifiers 16 and 17. Outputs from the two amplifiers 16 and 17 are input to respective input terminals of a differential amplifier 18, which in turn outputs a signal corresponding to a difference between two input signals.

This method is generally known as a "knife-edge method". The output from the differential amplifier 18 is a focusing error signal indicating a deviation between the position of a point (this point is hereinafter referred to as a focus of the beam 4) on which is focused the beam 4 converged by the objective lens 10 and the position of a recording surface of the recording medium 1. The focusing error signal is hereinafter referred to as an FE signal. The FE signal is input to an A/D converter 30 and to an in-focus detection circuit 50. The A/D converter 30 converts input analogue signals to digital signals and outputs the digital signals. The output from the A/D converter 30 is input to a D/A converter 31 via a phase compensation digital filter 22, which provides the focusing control system with a phase margin. The D/A converter 31 converts input digital signals to analogue signals and outputs the analogue signals. The output from the D/A converter 31 is input to a drive circuit 35 via a switch 33. The drive circuit 35 causes an electric current corresponding to an input signal thereof to flow in the coil 89.

As described above, the electric current corresponding to the FE signal is caused to flow in the coil 89 and moves the objective lens 10 up and down, thereby achieving an appropriate focusing control operation so that the beam 4 is always focused on the recording surface of the recording medium 1. The switch 33 has three input terminals A, B, and C, one output terminal D, and one control terminal E. When the control terminal E is at a low level, the input terminal A is connected to the output terminal D. When the control terminal E is at a middle level, the input terminal B is connected to the output terminal D. When the control terminal E is at a high level, the input terminal C is connected to the output terminal D.

In general, the "knife-edge" method can detect the deviation in the range of about 20 $\mu$m. If the deviation between the focus of the beam 4 converged by the objective lens 10 and the recording surface of the recording medium 1 is out of this range, the focusing control cannot be appropriately performed even when the input terminal A and the output terminal D of the switch 33 are connected to each other. Because of this, the deviation between the focus of the beam 4 and the recording surface of the recording medium 1 is rendered to fall within said range by moving the objective lens 10 in advance upon application of the electric current to the coil 89. Under such conditions, when the input terminal A and the output terminal D of the switch 33 are connected to each other, the focusing control can be performed appropriately.

The input terminal C of the switch 33 is connected to a triangular wave generator 41, which generates a signal required to move the objective lens 10. The switch 33 switches between a condition wherein the deviation between the focus of the beam 4 and the recording surface of the recording medium 1 is rendered to fall within the detectable range by moving the objective lens 10, and a condition wherein the focusing control is in operation. The operation for making the deviation between the focus of the beam 4 and the recording surface of the recording medium 1 fall within the detectable range by moving the objective lens 10 is hereinafter referred to as an initial operation. During the initial operation required for the focusing control, when the in-focus detection circuit 50 detects that the position of the focus of the beam 4 converged by the objective lens 10 is generally in agreement with that of the recording surface of the recording medium 1, the in-focus detection circuit 50 sends an in-focus detection signal to a microcomputer 37. The initial operation is triggered at the time the microcomputer 37 connects the input terminal C and the output terminal D of the switch 33 and sends a detection start instruction to the in-focus detection circuit 50 with a data line 70 rendered to be at a high level. When the in-focus detection signal is sent from the in-focus detection circuit 50 to the microcomputer 37, the microcomputer 37 connects the input terminal A and the output terminal D of the switch 33 to allow the focusing control operation.

In general, as the accuracy of quantization in the A/D converter 30 is reduced, control errors increase. Because of this, it is necessary to increase the number of bits in the A/D converter 30 in order to perform an A/D conversion in the full range of the FE signal and to keep the control accuracy required during data reproduction or the like, i.e., the accuracy of quantization. This, however, causes an increase in manufacturing cost of the A/D converter 30. Accordingly, the accuracy of quantization required for appropriate data reproduction or the like is generally maintained by restricting the range of the FE signal to be A/D-converted without increasing the number of bits.

In such a conventional focusing control system, the level of the FE signal is increased by a transient response at the time the focusing control operation is started or by a disturbance caused by, for example, some impact during the focusing control operation. As a result, the problem arises that the FE signal may exceed an A/D convertible level below which it can be A/D-converted. In particular, if the recording surface of a recording medium undulates during rotation thereof, an increase in level of the FE signal caused by the transient response is relatively large, and the FE signal appreciably exceeds the A/D convertible level. Under such conditions, although the level of the FE signal is increased, the level is made constant after the A/D conversion, thus making the focusing control system unstable. At the worst, the distance between the focus of the beam and the recording surface of the recording medium may exceed the detectable range of the FE signal. In this case, the appropriate focusing control cannot be expected.

SUMMARY OF THE INVENTION

The present invention has been developed to overcome the above-described disadvantages.

It is accordingly an object of the present invention to provide an improved focusing control system capable of performing a stable focusing control operation even if the number of bits in an A/D converter is small.

In accomplishing the above and other objects, a focusing control system according to the present invention performs a focusing control operation wherein a beam for reproducing signals from a recording surface of a recording medium is focused on the recording surface of the recording medium, and comprises a deviation detection means for detecting an amount of deviation between the position of a point on which the beam is focused and the position of the recording surface of the recording medium, an amplification means for amplifying an output signal from the deviation detection means, and an A/D conversion means for converting an output signal from the amplification means to a digital signal. The system according to the present invention further comprises a drive means for moving the point on which the beam is focused in a direction perpendicular to the recording surface of the recording medium, and a focusing control means for controlling the drive means in response to an output signal from the A/D conversion means so that the point on which the beam is focused is positioned on the recording surface of the recording medium. The amplification means has a variable amplification factor, and the focusing control means has a variable gain.

In the above-described construction, the amplification factor of the amplification means is reduced during a given period after the focusing control operation is triggered, whereas the gain of the focusing control means is increased in accordance with a reduction in amplification factor of the amplification means.

The focusing control system may includes a decision means for determining as to whether an output value of the deviation detection means falls within a given range. The decision means outputs a signal when the output value of the deviation detection means falls within the given range. In this case, the amplification factor of the amplification means is reduced between the time when the focusing control operation is triggered and the time the decision means outputs the signal.

Because the above-described construction causes no saturation in the A/D conversion means, the system is stably brought into a focusing control condition.

Conveniently, the decision means outputs a first signal when the output value of the deviation detection means falls within the given range, and outputs a second signal when the output value of the deviation detection means deviates from the given range. In this case, the amplification factor of the amplification means is reduced during a period in which the decision means outputs the second signal during the focusing control operation, whereas the gain of the focusing control means is increased in accordance with a reduction in amplification factor of the amplification means.

In this case also, because no saturation is caused in the A/D conversion means, the focusing control condition becomes stable.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 2:
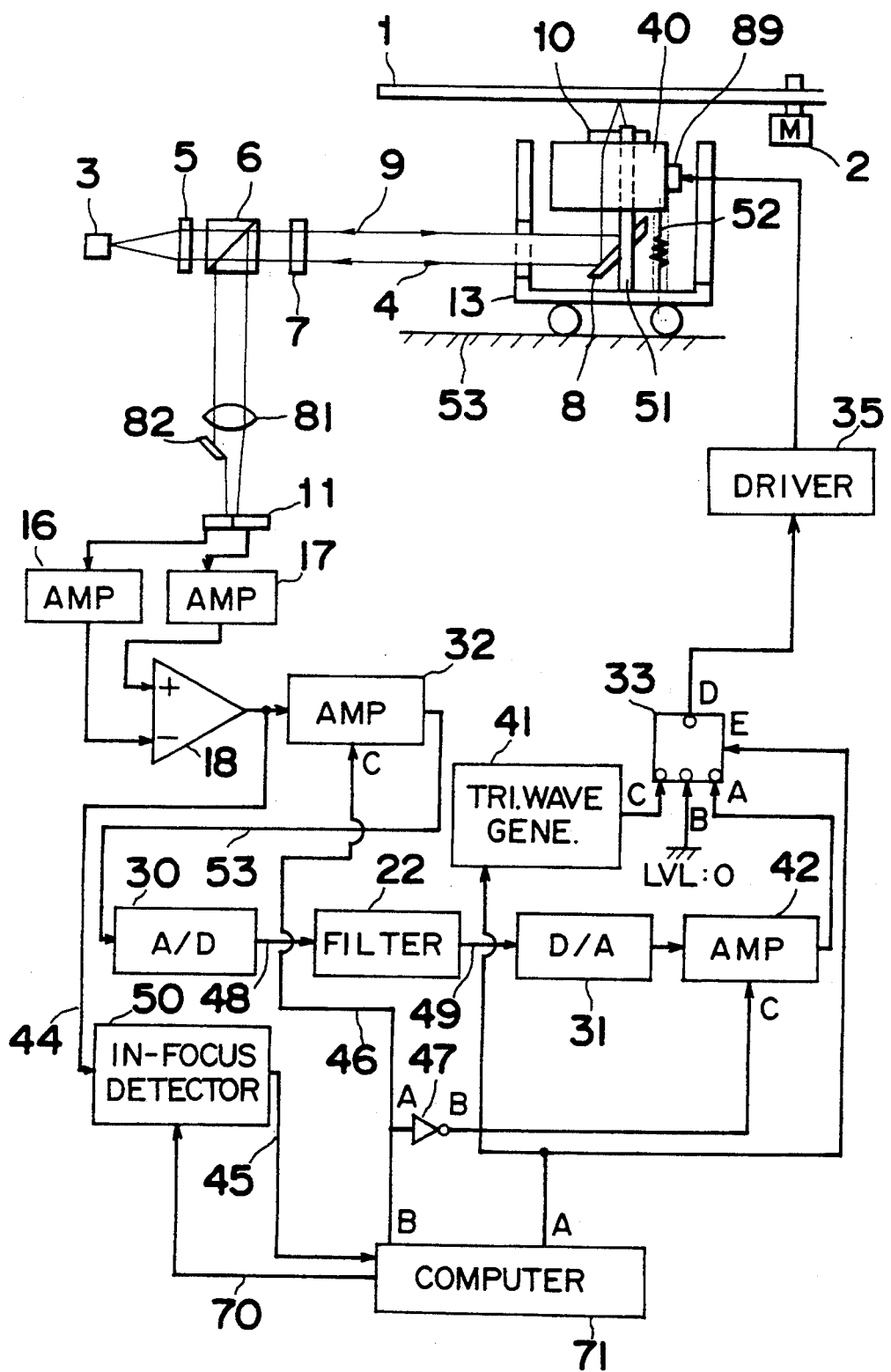
FIG. 2 is a block diagram of a focusing control system according to a first embodiment of the present invention.

Referring now to the drawings, there is shown in FIG. 2 a focusing control system according to a first embodiment of the present invention.

Figure 1:
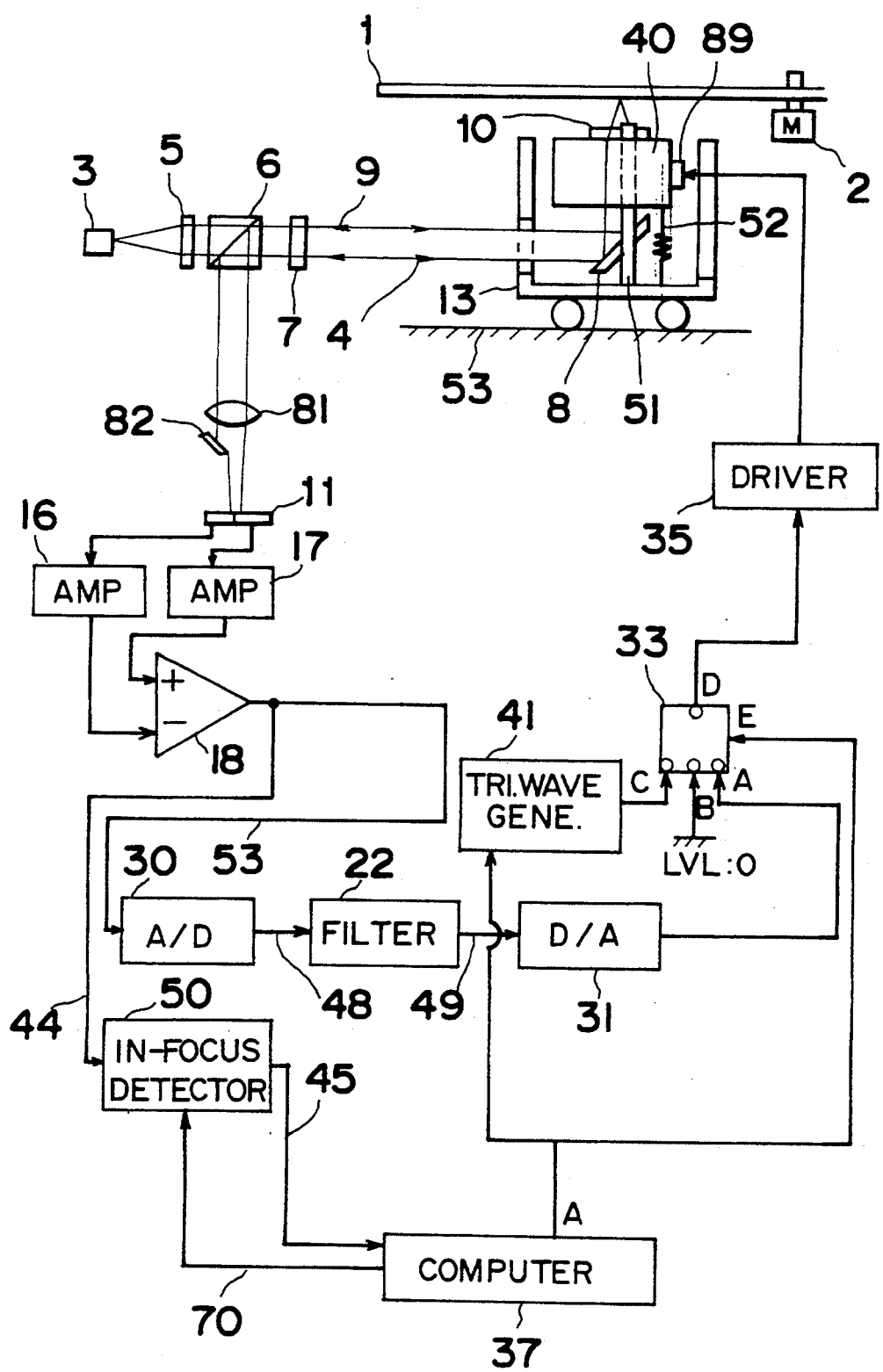
FIG. 1 is a block diagram of a conventional focusing control system for use in an optical disc apparatus.

Similar to the system of FIG. 1, an information carrier or recording medium 1 is mounted on a rotary shaft of a motor 2 for rotation together therewith at a predetermined speed. A beam 4 emitted from a light source 3 such as, for example, a semiconductor laser diode is collimated by a coupling lens 5 and then passes through a polarization beam splitter 6 and a ¼ wavelength plate 7. Thereafter, the parallel beam is reflected from a total reflection mirror 8, converged by an objective lens 10, and is eventually irradiated on the recording medium 1. The objective lens 10 is secured to a movable member 40 having a bearing. The bearing allows the movable member 40 to move up and down along a vertically extending slide shaft 51 secured to a carrier 13 and to rotate about the slide shaft 51. The movable member 40 is connected with the carrier 13 by means of a rubber spring 52 and is appropriately adjusted such that an optical axis of the beam 4 is generally aligned with that of the objective lens 10. The carrier 13 can move on a platform 53 in a direction radially of the recording medium 1. When a coil 89 is energized by making an electric current flow therein, the movable member 40 receives the electromagnetic force therefrom and moves up and down along the slide shaft 51.

Light 9 reflected from the recording medium 1 passes through the objective lens 10 and is further reflected from the total reflection mirror 8. Thereafter, the light passes through the ¼ wavelength plate 7 and is reflected from the polarization beam splitter 6. The light then enters a detection lens 81 and passes therethrough. A part of the light is irradiated on an optical detector 11 having a two-split construction. Two outputs from the optical detector 11 are input into respective amplifiers 16 and 17. Outputs from the two amplifiers 16 and 17 are input to respective input terminals of a differential amplifier 18, which in turn outputs a signal (FE signal) corresponding to a difference between two input signals.

The FE signal output from the differential amplifier 18 is input to an amplifier 32 and to an in-focus detection circuit 50. The amplifier 32 changes an amplification factor according to the level of a control terminal C thereof. When the control terminal C is at a high level, the amplification factor is 1. When the control terminal C is at a low level, the amplification factor is 0.5. When the amplification factor is 0.5, an A/D converter 30 can perform an A/D conversion in the full range of the FE signal level. When the amplification factor is 1, the accuracy of quantization required during data reproduction is ensured in the A/D converter 30. An output from the amplifier 32 is input to the A/D converter 30, which converts input analogue signals to digital signals and outputs the digital signals. The output from the A/D converter 30 is input to a D/A converter 31 via a phase compensation digital filter 22, which provides the focusing control system with a phase margin. The D/A converter 31 converts input digital signals to analogue signals and outputs the analogue signals. The output from the D/A converter 31 is input to an amplifier 42. When a control terminal C of the amplifier 42 is at a high level, the amplification factor is 2. When the control terminal C of the amplifier 42 is at a low level, the amplification factor is 1.

The control terminal C of the amplifier 32 is connected to a microcomputer 71 via a control line 46. The control line 46 is connected to an input terminal A of an inverter 47. When a low level signal is input to the inverter 47, the inverter 47 outputs a high level signal. In contrast, when a high level signal is input to the inverter 47, the inverter 47 outputs a low level signal. An output terminal B of the inverter 47 is connected to the control terminal C of the amplifier 42. An output from the amplifier 42 is led to a drive circuit 35 via a switch 33. The drive circuit 35 causes an electric current corresponding to an input signal thereof to flow in the coil 89.

As described above, the electric current corresponding to the FE signal is caused to flow in the coil 89 and moves the objective lens 10 up and down, thereby achieving an appropriate focusing control operation so that the beam 4 is always focused on a recording surface of the recording medium 1. The switch 33 has three input terminals A, B, and C, one output terminal D, and one control terminal E. When the control terminal E is at a low level, the input terminal A is connected to the output terminal D. When the control terminal E is at a middle level, the input terminal B is connected to the output terminal D. When the control terminal E is at a high level, the input terminal C is connected to the output terminal D.

Regarding a triangular wave generator 41 and an in-focus detection circuit 50, description thereof is omitted, because they are the same in construction and in operation as those of the system shown in FIG. 1.

The system of FIG. 2 operates as follows. Immediately after a focusing control operation has been triggered by the operation of the switch 33, the level of the FE signal greatly fluctuates in the presence of a transient response. Accordingly, if the level of a signal input to the A/D converter 30 is enlarged to such a level that the accuracy of quantization required during data reproduction is ensured, an input value of the A/D converter 30 may deviate from an A/D convertible range wherein input data can be A/D-converted. To solve this problem, during a predetermined period of time after the focusing control operation has been started, the microcomputer 71 sets, through the control line 46, the control terminal C of the amplifier 32 at a low level, thereby reducing the amplification factor of the amplifier 32. By doing so, the A/D converter 30 can perform the A/D conversion in the full range of the FE signal level. Furthermore, because the control terminal C of the amplifier 42 is set at a high level by the inverter 47, the amplification factor of the amplifier 42 is doubled. As a result, a gain of the focusing control system is maintained constant. After the focusing control operation has been stabilized, the input signal level of the A/D converter 30 is enlarged to such a level that the accuracy of quantization required during data reproduction is ensured.

The above-described operation is discussed in detail with reference to FIG. 3.

Figure 3:
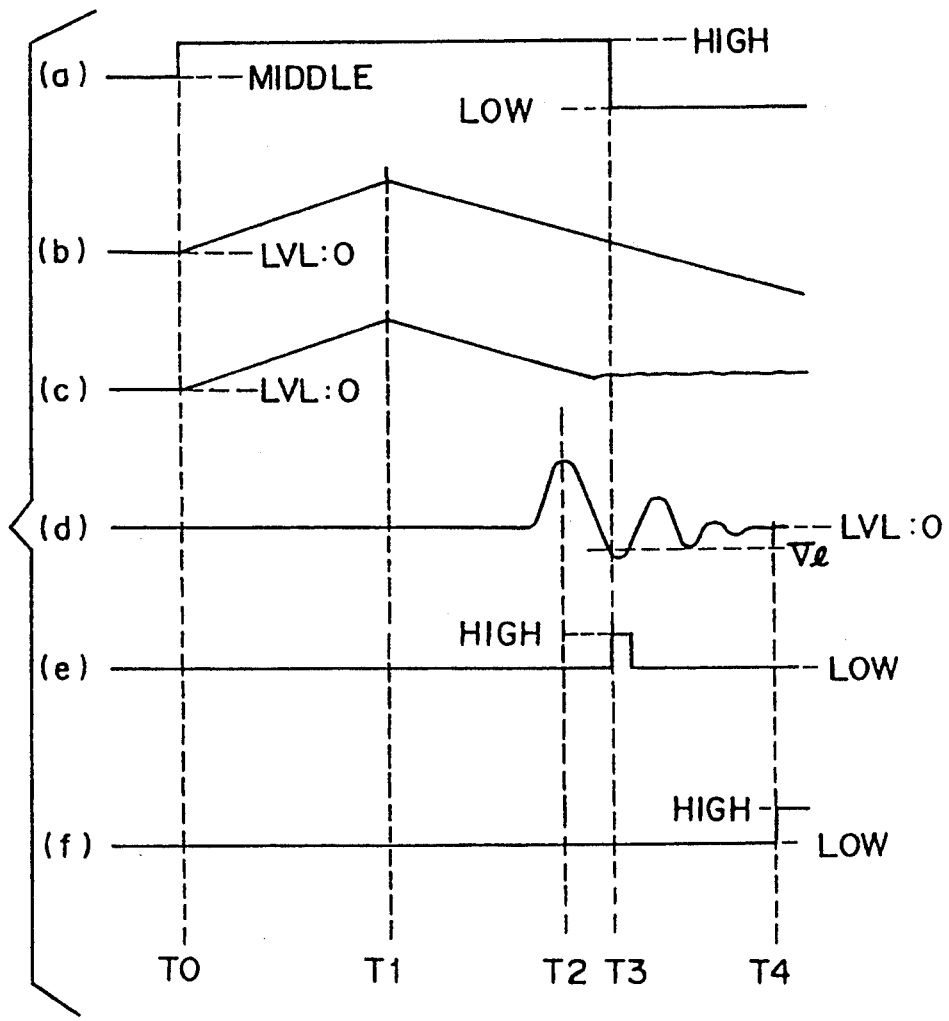
FIG. 3 is a waveform chart explanatory of the operation of the system of FIG. 2.

In FIG. 3, (a) indicates a signal from an output terminal A of the microcomputer 71. (b) indicates a signal from the triangular wave generator 41. (c) indicates a point (focus) on which the beam 4 is focused. (d), (e) and (f) indicate an FE signal, an in-focus detection signal, and a signal from an output terminal B of the microcomputer 71, respectively.

The period during which the signal from the output terminal A of the microcomputer 71 is at a high level is a period for an initial operation in preparation for the focusing control operation. When this signal is rendered to be at the high level at a time T0, the triangular wave generator 41 starts generating a triangular wave, as shown by (b) of FIG. 3. Because the control terminal E of the switch 33 is at a high level, the input terminal C and the output terminal D are connected to each other. Accordingly, an electric current corresponding to an output waveform of the triangular wave generator 41 is caused to flow in the coil 89, and the focus of the beam 4 moves as shown by (c) of FIG. 3. At a time T1, the focus of the beam 4 is positioned closest to the recording medium 1, and thereafter, the former gradually departs from the latter. At a time T2, when the distance between the focus of the beam 4 and the recording surface of the recording medium 1 becomes about 10 $\mu$m, which falls within the detectable range of the FE signal, the level of the FE signal becomes high. At a time T3, the level of the FE signal is below $V_l$, and an in-focus detection signal is output from the in-focus detection circuit 50, as shown by (e) of FIG. 3. The operation of the in-focus detection circuit 50 is discussed later. When the in-focus detection signal becomes high at the time T3, the output terminal A of the microcomputer 71 is rendered to be at a low level, as shown by (a) of FIG. 3, thereby connecting the input terminal A and the output terminal D of the switch 33 for the subsequent focusing control operation. As shown by (f) of FIG. 3, the signal from the output terminal B of the microcomputer 71 is maintained at a low level until a time T4. Accordingly, the amplification factor of the amplifier 32 is maintained 0.5. The A/D converter 30 can perform an A/D conversion in the full range of the FE signal level for a period of time from T3 to T4, during which the focusing control system is in operation. Accordingly, even if the level of the FE signal is increased in the presence of a transient response, it always falls within the A/D convertible range, and the system is stably brought into a focusing control condition. Because the terminal C of the amplifier 42 is set at a high level by the inverter 47, the amplification factor of the amplifier 42 is set to 2, thus maintaining the gain of the focussing control system constant. The transient response is stabilized by the time T4 at which the signal from the output terminal B of the microcomputer 71 is rendered to be at a high level, as shown by (f) of FIG. 3. Accordingly, after the time T4, although the range of the FE signal wherein the A/D conversion can be performed by the A/D converter 30 is limited, the accuracy of quantization required for, for example, data reproduction is ensured. Because the amplification factor of the amplifier 32 and that of the amplifier 42 are both set to 1, the gain of the focusing control system is maintained constant. It is to be noted that the time T4 is set according to the response speed of the focusing control system.

Figure 4:
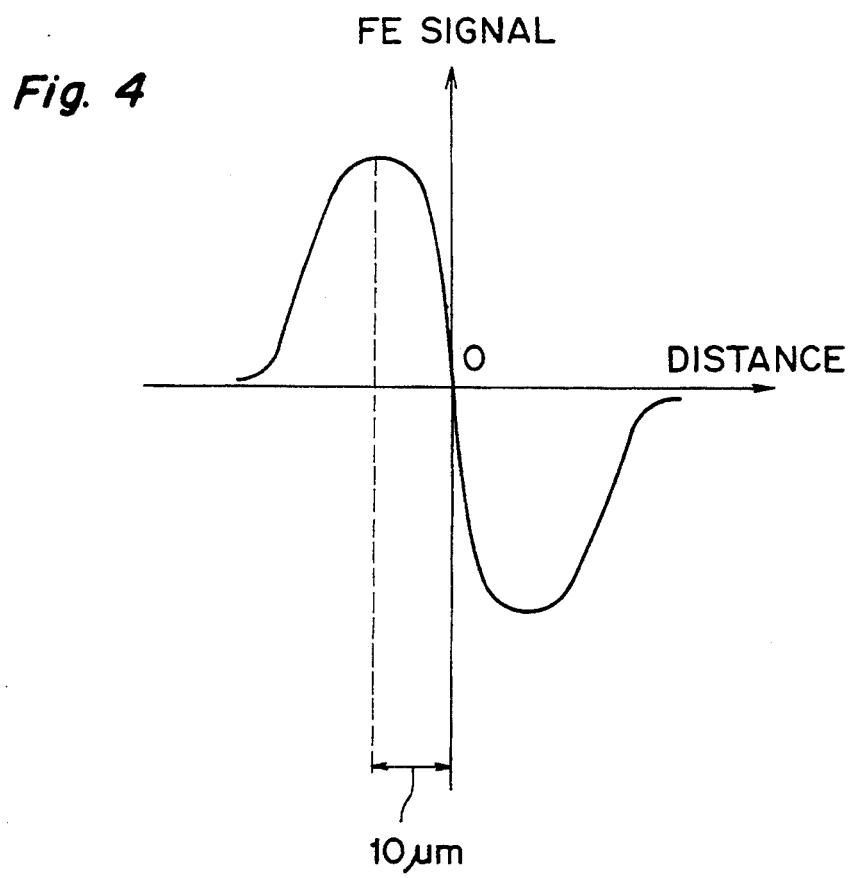
FIG. 4 is a graph indicating a relationship between an FE signal and the distance between the position of a point on which a beam is focused and that of a recording surface of a recording medium.

The FE signal output from the differential amplifier 18 is discussed hereinafter with reference to a graph of FIG. 4. In this graph, the axis of abscissa indicates the distance between the focus of the beam 4 converged by the objective lens 10 and the recording surface of the recording medium 1, whereas the axis of ordinate indicates the level of the FE signal. A level 0 indicates an in-focus condition wherein the focus of the beam 4 is positioned just on the recording surface of the recording medium 1. A distance of about 10 $\mu$m is generally the maximum value in level of the FE signal. Accordingly, as discussed previously, it is necessary to perform the initial operation prior to the focusing control operation so that the distance between the focus of the beam 4 and the recording surface of the recording medium 1 may be within the range of about 10 $\mu$m.

Figure 5:
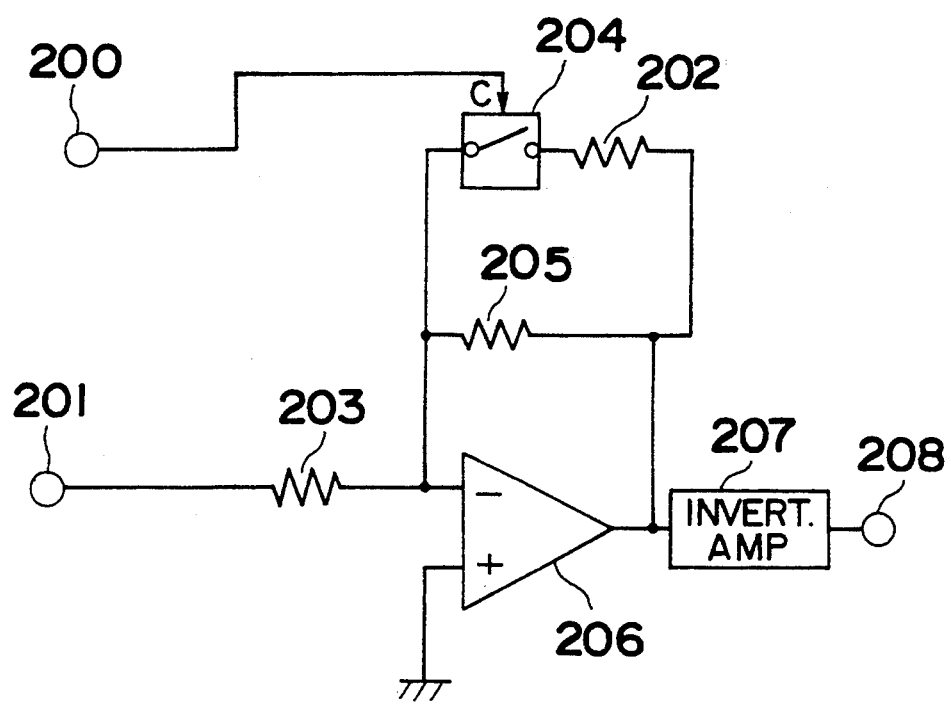
FIG. 5 is a block diagram of an amplifier provided in the system of FIG. 2.

The amplifier 32 is discussed in detail with reference to FIG. 5.

An input terminal 200 of the amplifier 32 is connected to the control line 46 shown in FIG. 2. An input terminal 201 and an output terminal 208 are connected to a data line 44 and to a data line 53, respectively. Each of three resistors 202, 203, and 205 has a resistance of Ra ohm. When the control terminal C is at a low level, a switch 204 is closed. A differential amplifier 206 together with the resistors 202, 203, and 205 constitutes an inverting amplifier. An inverting amplifier 207 has a gain of 1. Accordingly, when the input terminal 200 is at a high level, the gain of the amplifier 32 becomes 1, and when the input terminal 200 is at a low level, the gain of the amplifier 32 becomes 0.5.

Figure 6:
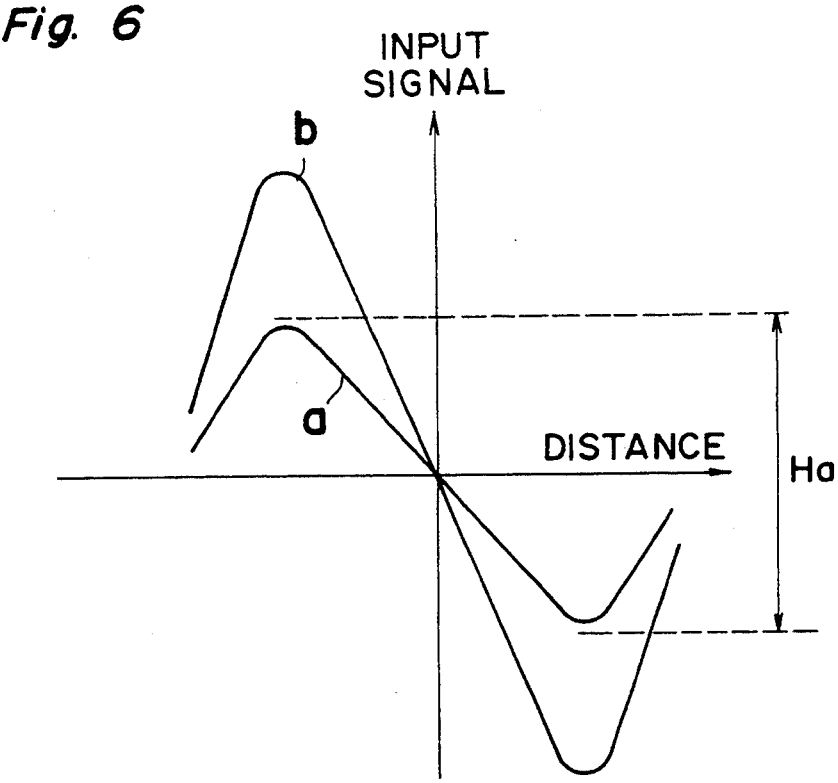
FIG. 6 is a graph indicating a relationship between the level of a signal input to an A/D converter and said distance.

The relationship between the level of an input signal of the A/D converter 30 and the A/D convertible range is discussed with reference to FIG. 6 indicating the input signal of the A/D converter 30. The axis of ordinate indicates the level of the input signal, whereas the axis of abscissa indicates the distance between the focus of the beam 4 converged by the objective lens 10 and the recording surface of the recording medium 1. A range Ha indicates the A/D convertible range. A solid line (a) indicates a level of the input signal at the time the amplification factor of the amplifier 32 is 0.5, whereas a solid line (b) indicates a level of the input signal at the time the amplification factor of the amplifier 32 is 1. The full range of the input signal level is far beyond the range Ha. However, the accuracy of quantization required for data reproduction or the like is ensured.

Figure 7:
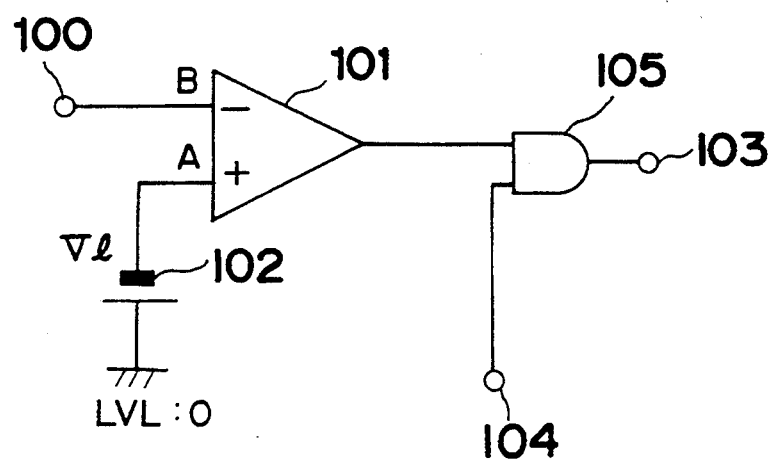
FIG. 7 is a block diagram of an in-focus detection circuit provided in the system of FIG. 2.

FIG. 7 depicts one example of the in-focus detection circuit 50. An input terminal 100, an input terminal 104, and an output terminal 103 are connected to data lines 44, 70, and 45, respectively. The input terminal 100 is connected to a terminal B of a comparator 101. To a terminal A of the comparator 101 is connected a reference power source 102. The terminal A of the comparator 101 is at a negative level due to polarity of the reference power source 102, and the level thereof is $-Vl$. When the level of the terminal B is lower than that of the terminal A, i.e., $-Vl$, the comparator 101 outputs a high level signal. The output from the comparator 101 is input to an AND gate 105. When the output signal from the comparator 101 and a signal from an input terminal 104 are both high level signals, the AND gate 105 outputs a high level signal via an output terminal 103 thereof. Accordingly, when the input terminal 104 of the AND gate 105 is set at a high level by the microcomputer 71, it is determine that the level of the FE signal input to the input terminal 100 has been rendered to be below −V1.

The accuracy of quantization of the A/D converter 30 is discussed hereinafter.

Figure 8:
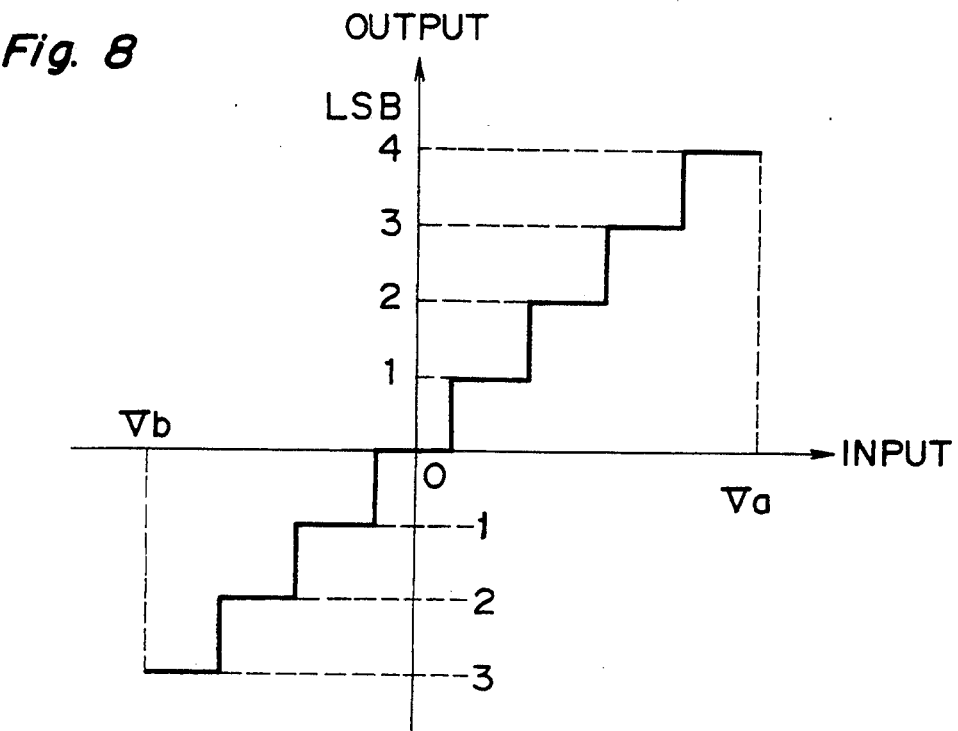
FIG. 8 is a graph indicating a relationship between the input level of a three-bit A/D converter and the output value.

The control accuracy is greatly affected by the accuracy of quantization of the A/D converter 30 for converting the FE signal to a digital signal. FIG. 8 is a graph indicating a relationship between the input level of a three-bit A/D converter and the output value. As shown in this graph, an amount of change Vd in input level which causes an amount of change 1 LSB in output value is given by:

$$Vd = \frac{Va - Vb}{8}$$

The longer the distance between the focus of the beam 4 corresponding to Vd and the recording surface of the recording medium 1 is, the lower the accuracy of quantization becomes. Also, the shorter the former is, the higher the latter becomes. A reduction in distance between the focus of the beam 4 corresponding to Vd and the recording surface of the recording medium 1 results from an increase in amplification factor of the FE signal input to the A/D converter 30. Because of this, when the accuracy of quantization is enhanced, the level of the FE signal does not fall within the A/D convertible range from Vb to Va and is saturated.

Figure 9:
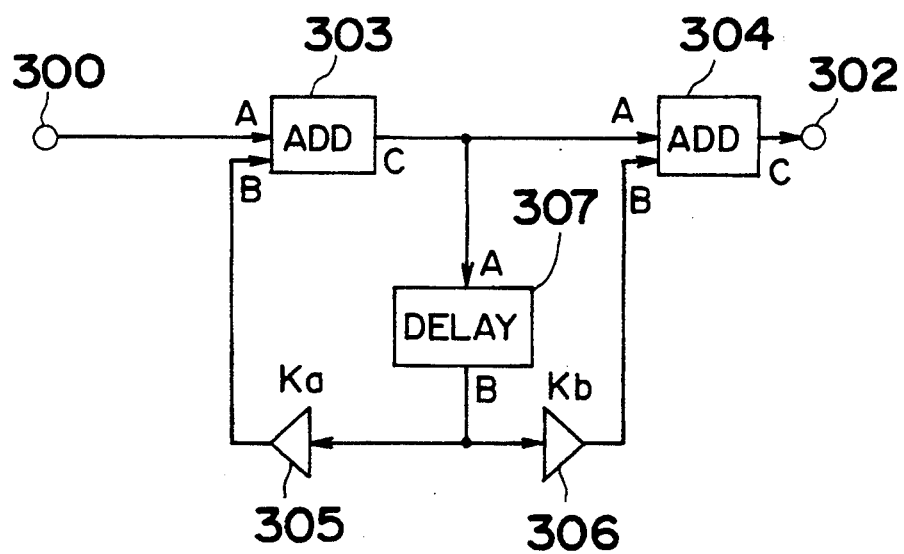
FIG. 9 is a block diagram of a phase compensation digital filter provided in the system of FIG. 2.

FIG. 9 depicts one example of the phase compensation digital filter 22. An input terminal 300 and output terminal 302 are connected to data bus lines 48 and 49 shown in FIG. 2, respectively. Each of adders 303 and 304 adds digital signals input from associated input terminals A and B and outputs the result of addition via an output terminal C. Each of multipliers 305 and 306 multiplies a digital signal input thereto by a constant Ka or Kb and outputs the result of multiplication. The multipliers 305 and 306 and the adders 303 and 304 are operated at a predetermined sampling period Ts. A delay circuit 307 delays a digital signal input thereto by Ts and outputs it via an output terminal B thereof.

Figure 10:
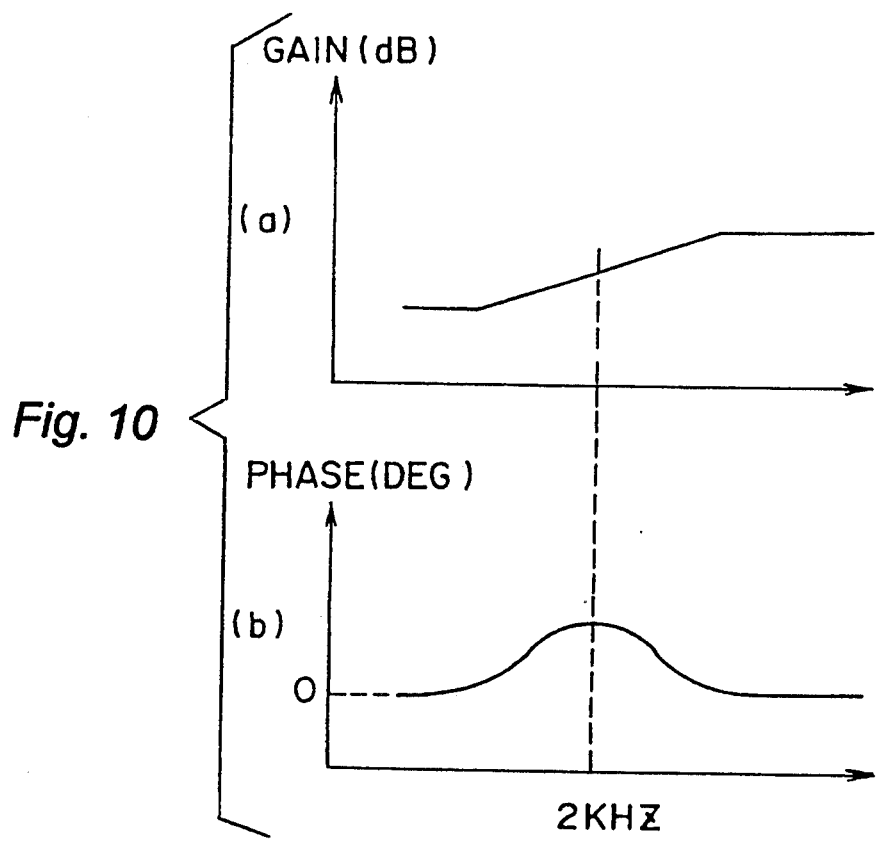
FIG. 10 is characteristic curves of the phase compensation digital filter.

The digital filter shown in FIG. 9 is generally known as a "primary digital filter of a direct form". A phase compensation filter required to provide the control system with an appropriate phase margin can be realized by setting Ka and Kb to respective predetermined values. FIG. 10 indicates characteristic curves. (a) indicates the gain, whereas (b) indicates the phase. In each of the two characteristic curves, the axis of abscissa indicates the frequency. The gain is expressed in unit of dB, whereas the frequency is expressed in logarithm. A gain intersection in focusing control systems is generally positioned at about 2 kHz, and the phase advances in the proximity of a frequency of 2 kHz.

Detailed discussion is omitted with respect to the amplifier 42, because the amplifier 42 is substantially the same in construction as the amplifier 32.

It is to be noted here that in the above-described embodiment, although the amplification factor of the amplifier 32 is set to 1 or 0.5, the amplification factor may be varied so long as the accuracy of quantization required for data reproduction or the like is ensured.

Figure 11:
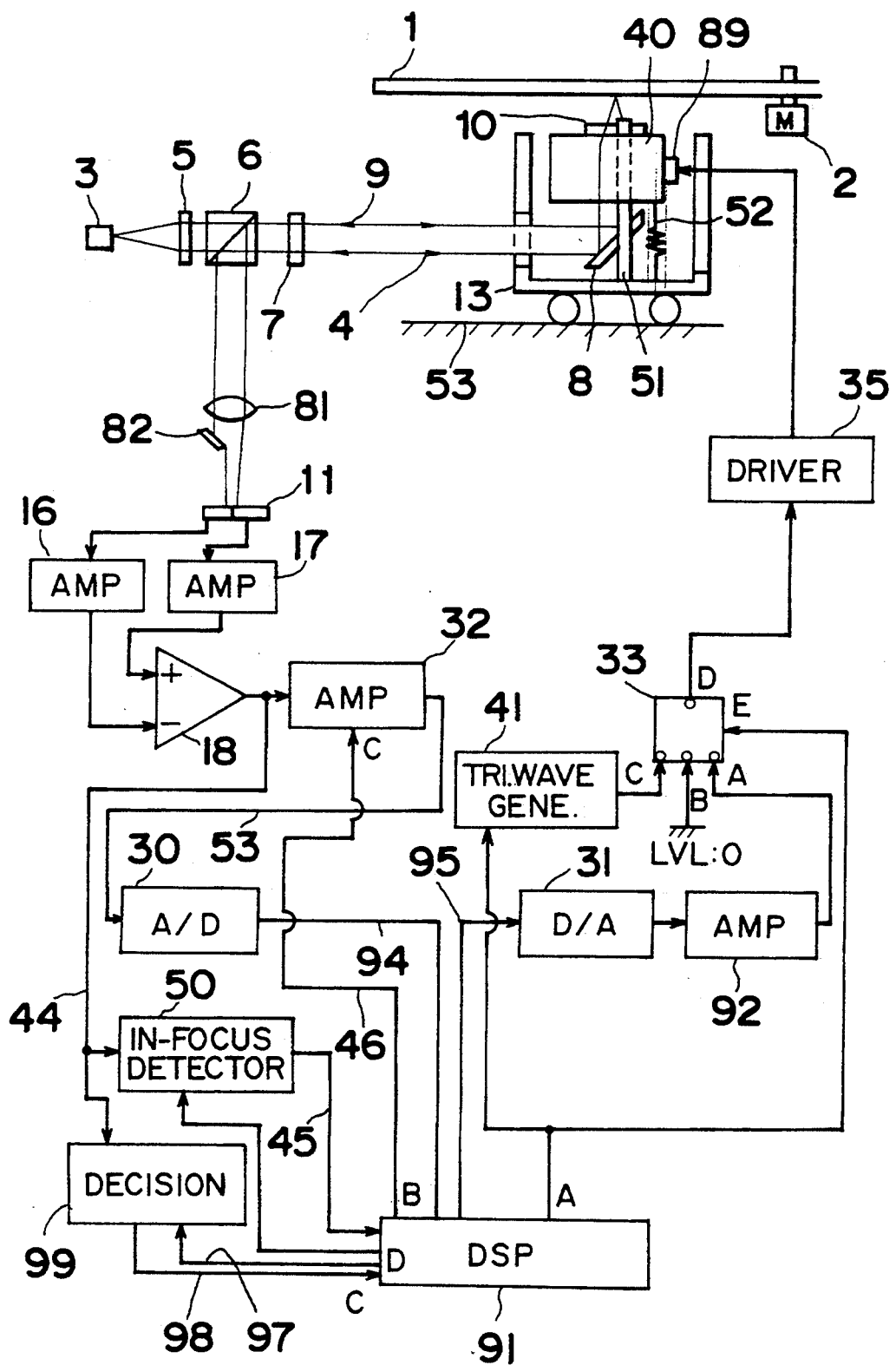
FIG. 11 is a diagram similar to FIG. 2, but according to a second embodiment of the present invention.

FIG. 11 depicts a focusing control system according to a second embodiment of the present invention.

As is the case with the focusing control system shown in FIG. 2, when a terminal C of an amplifier 32 is at a high level, the amplification factor is 1, and when the terminal C is at a low level, the amplification factor is 0.5. When the amplification factor is 0.5, an A/D converter 30 can A/D-convert an FE signal in almost the full range of the level thereof. When the amplification factor is 1, the A/D converter 30 can ensure the accuracy of quantization required for data reproduction or the like.

An output from a differential amplifier 18 is led to an amplifier 32 and to a decision circuit 99. The decision circuit 99 determines as to whether the value of the FE signal input thereto successively for a predetermined period falls within a given range. An output from the A/D converter 30 is led to a digital signal processor 91 via a data bus line 94. The digital signal processor 91 accommodates a phase compensation digital filter constituted by software to provide the focusing control system with a phase margin. The digital signal processor 91 receives an output from the A/D converter 30, processes the value thereof with the use of the phase compensation digital filter, and outputs it to a D/A converter 31 via a data bus line 95. An output from the D/A converter 31 is led to a drive circuit 35 via an amplifier 92 and a switch 33. Accordingly, because an electric current corresponding to the FE signal is caused to flow in a coil 89, an appropriate focusing control is performed wherein the focus of a beam 4 is positioned just on the recording surface of a recording medium 1. The digital signal processor 91 also receives an output signal from the decision circuit 99, and changes not only the amplification factor of the amplifier 32 via a data bus line 46 but also the gain of the phase compensation digital filter in response to the signal received.

The focusing control system according to the second embodiment of the present invention operates as follows.

When the digital signal processor 91 has detected that the value of the FE signal falls within the given range, the digital signal processor 91 ensures the required accuracy of quantization by increasing the amplification factor of the amplifier 32. In contrast, when the value of the FE signal does not fall within the given range, the amplification factor of the amplifier 32 is reduced to enable the digital signal processor 91 to capture the FE signal in the full range thereof, thereby stabilizing the focusing control system. The gain of the phase compensation digital filter accommodated in the digital signal processor 91 is switched to prevent the gain of the focusing control system from changing due to the switching of the amplification factor of the amplifier 32.

Figure 12:
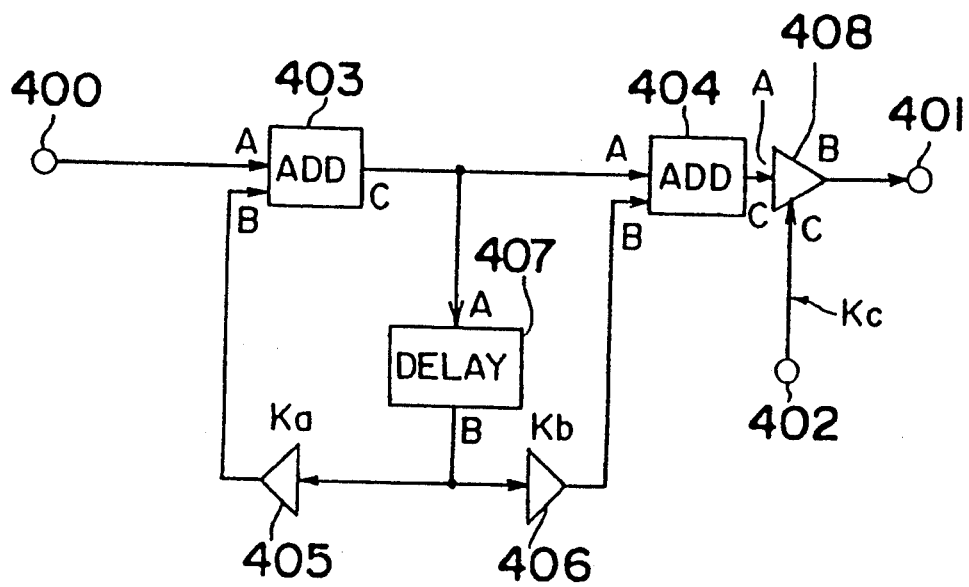
FIG. 12 is a block diagram of a phase compensation digital filter provided in the system of FIG. 11.

The operation of the phase compensation digital filter accommodated in the digital signal processor 91 is discussed in detail with reference to FIG. 12 indicating one example thereof.

An input terminal 400 and an output terminal 401 are connected to the data bus lines 94 and 95 shown in FIG. 11, respectively. The value of a constant Kc to be input to an input terminal 402 is set by the digital signal processor 91 itself. Each of adders 403 and 404 adds digital signals input to input terminals A and B thereof and outputs the result of addition via an output terminal C thereof. Each of multipliers 405 and 406 multiplies a digital signal input thereto by a constant Ka or Kb and outputs the result of multiplication. The multipliers 405 and 406 and the adders 403 and 404 are operated at a predetermined sampling period Ts. A delay circuit 407 delays a digital signal input thereto by Ts and outputs it via an output terminal B thereof. A multiplier 408 multiplies a digital signal input to an input terminal A thereof by a constant Kc input to an input terminal C thereof and outputs the result of multiplication via an output terminal B thereof. Although the digital filter of FIG. 12 is substantially the same in construction as that of FIG. 9, the former can change the gain by changing the constant Kc input to the input terminal 403 thereof.

Figure 13:
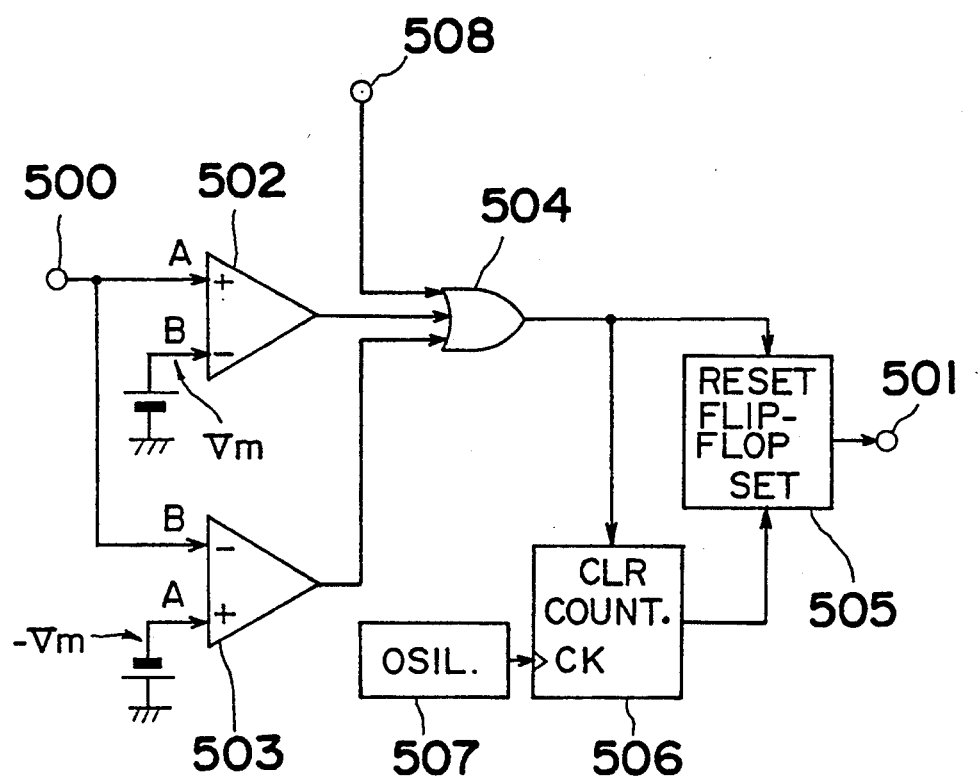
FIG. 13 is a block diagram of a decision circuit provided in the system of FIG. 11.

FIG. 13 depicts one example of the decision circuit 99. An input terminal 500 is connected to the data bus line 44 shown in FIG. 11. An output terminal 501 and an input terminal 508 are connected to the data bus lines 98 and 97 shown in FIG. 11, respectively. Each of comparators 502 and 503 outputs a high level signal when a level of a terminal A is higher than that of a terminal B. The terminal B of the comparator 502 and the terminal A of the comparator 503 are set at Vm and −Vm, respectively. An OR gate 504 outputs a high level signal when at least one of a plurality of input terminals is at a high level. An output from a flip-flop 505 is at a high level after a terminal SET thereof is rendered to be at a high level. In contrast, the output from the flip-flop 505 is kept at a low level after a terminal RESET thereof is rendered to be at a high level. A counter 506 counts clock signals of an oscillator 507 input to a terminal CK thereof. When the counter value becomes 5, the counter 506 outputs a high level signal. When a terminal CLR is at a high level, the counter value is cleared.

Figure 14:
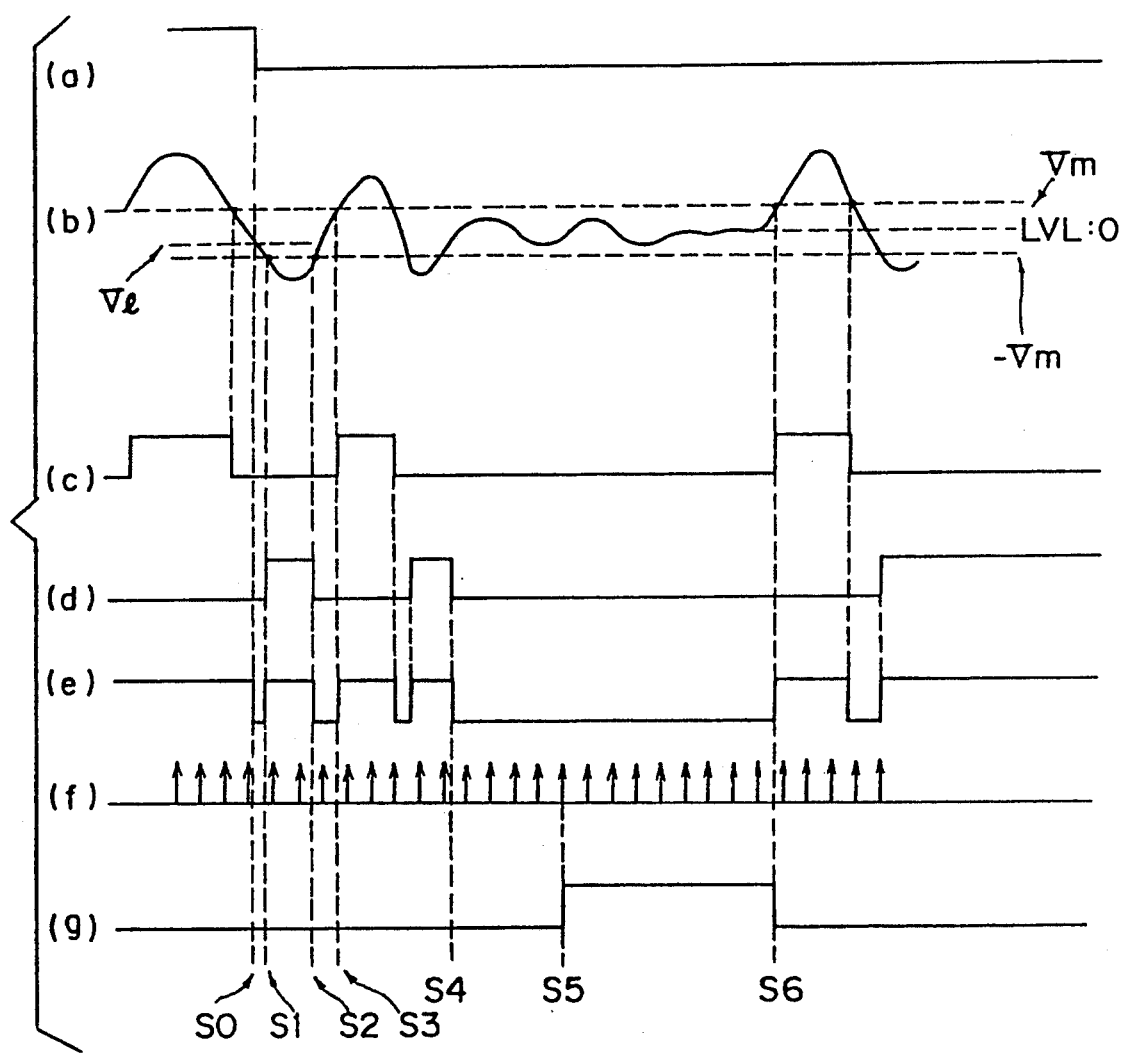
FIG. 14 is a waveform chart explanatory of the operation of the decision circuit.

The operation of the decision circuit 99 is discussed with reference to waveforms of FIG. 14. A waveform (a) indicates a signal input to the input terminal 508. A waveform (b) indicates a signal input to the input terminal 500. A waveform (c) indicates an output signal from the comparator 502. A waveform (d) indicates an output signal from the comparator 503. Waveforms (e), (f), and (g) indicate an output signal from the OR gate 504, that from the oscillator 507, and that from the flip-flop 505, respectively.

At a time S0, when the input terminal 508 is rendered to be at a low level, the output from the OR gate 504 is set at a low level, and the counter 506 starts counting. When the signal of the input terminal 500 becomes lower than a level of −Vm during a period from a time S1 to a time S2, the output from the comparator 503 is rendered to be at a high level. As a result, the output from the OR gate 504 is rendered to be at a high level, and the output from the flip-flop 505 is again set at a low level. Because the output from the comparator 502 and that from the comparator 503 are both at respective low levels during a period from the time S2 and a time S3, the counter 506 starts counting. However, because the signal of the input terminal 500 becomes higher than a level of Vm at the time S3, the output from the comparator 502 is rendered to be at a high level, thereby clearing the counter 506. Accordingly, the counter value is 1, and the output from the counter 506 is kept at a low level. During a period from a time S4 to a time S5, because the signal of the input terminal 500 falls within the range between −Vm and Vm, the counter value becomes 5 and the counter 506 outputs a high level signal, thereby rendering the output from the flip-flop 505 to be at a high level at a time S5. When the signal of the input terminal 500 exceeds the level of Vm at a time S6, the output from the comparator 502 is rendered to be at a high level and that from the flip-flop 505 is rendered to be at a low level. The fact that the FE signal has fallen within the given range for the predetermined period can be detected by inputting the FE signal to the input terminal 500.

Figure 15:
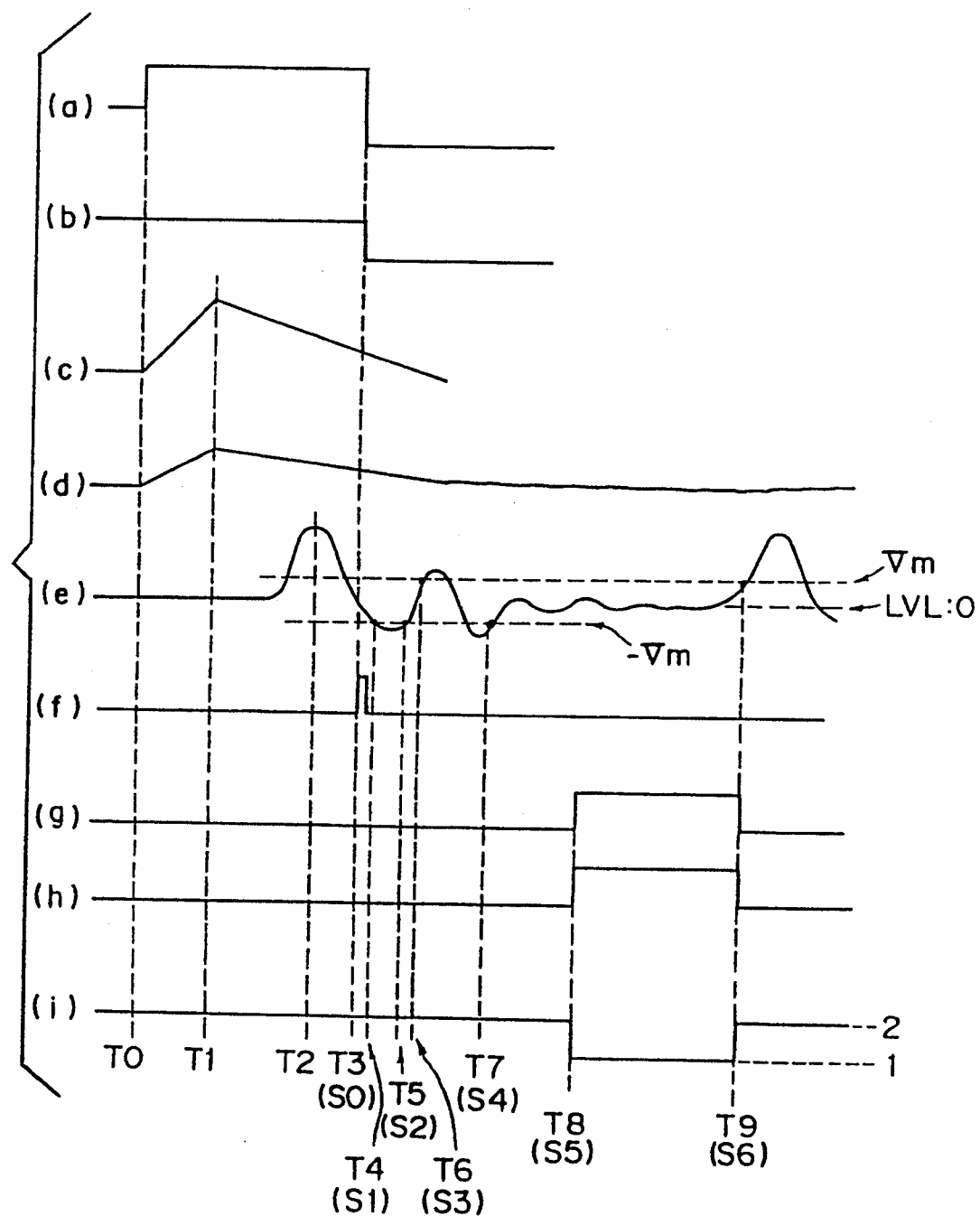
FIG. 15 is a waveform chart explanatory of the operation of the system of FIG. 11.

The shift to the initial operation condition and to the focusing control condition is discussed with reference to FIG. 15. A waveform (a) indicates a signal of the output terminal A of the digital signal processor 91. A waveform (b) indicates a signal of the output terminal D of the digital signal processor 91. A waveform (c) indicates an output signal from the triangular wave generator 41. A waveform (d) indicates the focus of the beam 4. Waveforms (e), (f), (g), (h), and (i) indicate the FE signal, the in-focus detection signal, a signal output from the decision circuit 99, a signal of the output terminal B of the digital signal processor 91, and the value of the constant Kc of the phase compensation digital filter accommodated in the digital signal processor 91, respectively. Discussion is omitted with respect to the waveforms (a), (c), (d), and (f) because they are the same as those discussed with reference to FIG. 2 depicting the first embodiment of the present invention. The waveform (e) is the same as the waveform (b) of FIG. 14. Times T3, T4, T5, T6, T7, T8, and T9 correspond to the times S0, S1, S2, S3, S4, S5, and S6 shown in FIG. 14, respectively. As shown by the waveform (h), the output terminal B of the digital signal processor 91 is at a low level at the time T3 at which the focusing control system is closed. Accordingly, the amplification factor of the amplifier 32 is set to 0.5, and the FE signal can be A/D-converted by the A/D converter 30 in the full range in level thereof. The decision circuit 99 detects that the level of the FE signal has fallen within the range from −Vm to Vm for the predetermined period, and the output signal therefrom is rendered to be at a high level at a time T8, as best shown by the waveform (g). When the decision circuit 99 outputs a high level signal, the output terminal B of the digital signal processor 91 is rendered to be at a high level, as shown by the waveform (h), and the constant Kc of the phase compensation digital filter is rendered to be 1, as shown by the waveform (i). When the level of the FE signal exceeds Vm at a time T9, the decision circuit 99 outputs a low level signal, as shown by the waveform (g). As a result, the output terminal B of the digital signal processor 91 is rendered to be at a low level, as shown by the waveform (h), and the constant Kc of the phase compensation digital filter is set to 2, as shown by the waveform (i). By doing so, even if the FE signal is increased in the presence of a transient response or a disturbance caused by, for example, some impact during the focusing control operation, the amplification factor of the amplifier 32 can be reduced. As a result, the input value of the A/D converter 30 never exceeds the level below which an A/D conversion can be performed. The switching of the constant Kc of the phase compensation digital filter maintains the gain of the focusing control system constant, thereby stabilizing the focusing control operation.

In this embodiment, although the gain of the phase compensation digital filter of the digital signal processor 91 is changed by multiplication, the gain can be doubled merely by shifting data one bit in applications where the data are binary data. In other words, the amplification factor of the amplifier 32 may be changed to a value multiplied by $2^n$ while the gain of the phase compensation digital filter is changed to a value multiplied by $0.5^n$ (n: integer). In this case, software can be simplified.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A focusing control system for use in an information recording and reproducing apparatus, said focusing control system performing a focusing control operation wherein a beam for reproducing signals from a recording surface of a recording medium is focused on the recording surface of the recording medium, said focusing control system comprising:

a deviation detection means for detecting an amount of deviation between a position of a point on which the beam is focused and a position of the recording surface of the recording medium;

an amplification means for amplifying an output signal from said deviation detection means, said amplification means having a variable amplification factor;

an A/D conversion means for converting an output signal from said amplification means to a digital signal;

a drive means for moving said point on which the beam is focused in a direction perpendicular to the recording surface of the recording medium; and a focusing control means for controlling said drive means in response to an output signal from said A/D conversion means so that said point on which the beam is focused is positioned on the recording surface of the recording medium, said focusing control means having a variable gain, wherein the amplification factor of said amplification means is reduced during a given period after the focusing control operation is triggered and the gain of said focusing control means is increased in accordance with a reduction in amplification factor of said amplification means.

2. The system according to claim 1, wherein the amplification factor of said amplification means is set so that the output signal from said deviation detection means can be converted by said A/D conversion means substantially in a full range thereof.

3. The system according to claim 1, wherein the amplification factor of said amplification means is changed to a value multiplied by $2^n$ while the gain of said focusing control means is changed to a value multiplied by $0.5^n$, n being an integer.

4. The system according to claim 1, wherein said given period is longer than a period in which a transient response causes a focusing control signal to fluctuate in level.

5. A focusing control system for use in an information recording and reproducing apparatus, said focusing control system performing a focusing control operation wherein a beam for reproducing signals from a recording surface of a recording medium is focused on the recording surface of the recording medium, said focusing control system comprising:

a deviation detection means for detecting an amount of deviation between a position of a point on which the beam is focused and a position of the recording surface of the recording medium;

an amplification means for amplifying an output signal from said deviation detection means, said amplification means having a variable amplification factor;

an A/D conversion means for converting an output signal from said amplification means to a digital signal;

a drive means for moving said point on which the beam is focused in a direction perpendicular to the recording surface of the recording medium;

a focusing control means for controlling said drive means in response to an output signal from said A/D conversion means so that said point on which the beam is focused is positioned on the recording surface of the recording medium, said focusing control means having a variable gain; and a decision means for determining as to whether an output value of said deviation detection means falls within a given range, said decision means outputting a signal when the output value of said deviation detection means falls within the given range;

wherein the amplification factor of said amplification means is reduced between the time when the focusing control operation is triggered and the time said decision means outputs the signal and the gain of said focusing control means is increased in accordance with a reduction in amplification factor of said amplification means.

6. The system according to claim 5, wherein the amplification factor of said amplification means is set so that the output signal from said deviation detection means can be converted by said A/D conversion means substantially in a full range thereof.

7. The system according to claim 5, wherein the amplification factor of said amplification means is changed to a value multiplied by $2^n$ while the gain of said focusing control means is changed to a value multiplied by $0.5^n$, n being an integer.

8. A focusing control system for use in an information recording and reproducing apparatus, said focusing control system performing a focusing control operation wherein a beam for reproducing signals from a recording surface of a recording medium is focused on the recording surface of the recording medium, said focusing control system comprising:

a deviation detection means for detecting an amount of deviation between a position of a point on which the beam is focused and a position of the recording surface of the recording medium;

an amplification means for amplifying an output signal from said deviation detection means, said amplification means having a variable amplification factor;

an A/D conversion means for converting an output signal from said amplification means to a digital signal;

a drive means for moving said point on which the beam is focused in a direction perpendicular to the recording surface of the recording medium;

a focusing control means for controlling said drive means in-response to an output signal from said A/D conversion means so that said point on which the beam is focused is positioned on the recording surface of the recording medium, said focusing control means having a variable gain; and a decision means for determining as to whether an output value of said deviation detection means falls within a given range, said decision means outputting a first signal when the output value of said deviation detection means falls within the given range, said decision means outputting a second signal when the output value of said deviation detection means deviates from the given range;

wherein the amplification factor of said amplification means is reduced during a period in which said decision means outputs said second signal during the focusing control operation and the gain of said focusing control means is increased in accordance with a reduction in amplification factor of said amplification means.

9. The system according to claim 8, wherein the amplification factor of said amplification means is set so that the output signal from said deviation detection means can be converted by said A/D conversion means substantially in a full range thereof.

10. The system according to claim 8, wherein the amplification factor of said amplification means is changed to a value multiplied by $2^n$ while the gain of said focusing control means is changed to a value multiplied by $0.5^n$, n being an integer.

* * * * *

UNITED STATES PATENT AND TRADEMARK OFFICE
CERTIFICATE OF CORRECTION

PATENT NO.    : 5,347,502
DATED         : September 13, 1994
INVENTOR(S)   : Shinichi Yamada et al.

It is certified that error appears in the above-identified patent and that said Letters Patent is hereby corrected as shown below:

Column 14, claim 8, line 58, after "means" delete in-response and insert --in response--.

Signed and Sealed this

Twenty-eight Day of February, 1995

Attest:

BRUCE LEHMAN

Attesting Officer        Commissioner of Patents and Trademarks